(12) United States Patent
Karichev

(10) Patent No.: US 6,872,487 B2
(45) Date of Patent: Mar. 29, 2005

(54) FUEL CELL MODULE AND BATTERY BASED THEREON

(75) Inventor: Ziya Ramizovich Karichev, Moscow (RU)

(73) Assignee: Zakrytoe Aktsionernoe Obschestvo Independent Power Technologies "IPT", Saint-Petersburg (RU)

(*) Notice: Subject to any disclaimer, the term of this patent is extended or adjusted under 35 U.S.C. 154(b) by 295 days.

(21) Appl. No.: 10/297,395

(22) PCT Filed: Apr. 10, 2002

(86) PCT No.: PCT/RU02/00163
§ 371 (c)(1),
(2), (4) Date: Dec. 5, 2002

(87) PCT Pub. No.: WO02/084769
PCT Pub. Date: Oct. 24, 2002

(65) Prior Publication Data
US 2003/0134175 A1 Jul. 17, 2003

(30) Foreign Application Priority Data
Apr. 12, 2001 (RU) .......................................... 2001109733

(51) Int. Cl.[7] .......................... H01M 2/14; H01M 8/14; H01M 2/00
(52) U.S. Cl. .............................. 429/39; 429/16; 429/34; 429/38
(58) Field of Search .............................. 429/38, 34, 39, 429/16

(56) References Cited

U.S. PATENT DOCUMENTS

| 3,515,595 A | * | 6/1970 | Sanford ......................... 429/34 |
| 4,640,876 A | | 2/1987 | Warzawski et al. ............ 429/37 |
| 5,069,985 A | | 12/1991 | Cohen et al. ................... 429/26 |

FOREIGN PATENT DOCUMENTS

| DE | 42 01 632 A1 | 7/1993 |
| DE | 42 34 093 A1 | 4/1994 |
| FR | 2564249 | 11/1985 |
| FR | 2300425 | 9/1996 |
| RU | 94015177 | 12/1995 |

* cited by examiner

Primary Examiner—Patrick Ryan
Assistant Examiner—Thomas H. Parsons
(74) Attorney, Agent, or Firm—Jenkens & Gilchrist, P.C.

(57) ABSTRACT

A fuel cell module (FC) comprises at least two substantially rectangular FCs, each of which includes an anode with a current collector and an insulating frame positioned along the periphery of the anode and forming an anode chamber, a cathode with a current collector and an insulating frame positioned along the periphery of the cathode and forming a cathode chamber, and an electrolyte chamber formed by an insulating frame and positioned between the anode and the cathode, the insulating frames along the periphery are provided with ports for the inlet and outlet of hydrogen, oxygen/air and electrolyte and with channels connecting the ports to corresponding chambers. The ports and channels are positioned on the upper and/or the lower sides of the insulating frames, and the current collectors are brought out of the FCs through the lateral sides of the insulating frames.

28 Claims, 2 Drawing Sheets

FUEL CELL MODULE AND BATTERY BASED THEREON

FIELD OF THE INVENTION

The invention relates to the field of fuel cells (FC) and may be used during the production of FC modules having a layered frame construction with internal collectors for the inlet and outlet of the working mediums.

BACKGROUND OF THE INVENTION

An FC module of filter-press construction, comprising a plurality of FCs of frame construction with insulating frames is known. Ports are positioned uniformly on the periphery of the frames for the inlet and outlet of working mediums. Electrical switching of the FCs in the module is carried out by means of bipolar plates (FR, 2300425, H 01 M 8/24, Oct. 8, 1976).

A drawback of this FC module is related to the absence of external current taps from each FC, which limits the possibility for electrical switching in the module to only a series connection via the bipolar plates. Furthermore, arrangement of the ports along the whole perimeter of the insulating frames completely excludes the possibility of executing external current taps from each FC and also makes sealing of the component FCs in the module more complex.

Among known FC modules, the one most similar to the instant invention in respect to the combination of material features and achieved technical result is the FC module comprising at least two rectangular FCs, each of which includes an anode with a current collector and an insulating frame positioned along the periphery of the anode and forming an anode chamber, a cathode with a current collector and an insulating frame positioned along the periphery of the cathode and forming a cathode chamber, and an electrolyte chamber formed by an insulating frame and positioned between the anode and the cathode, insulating frames along the periphery are provided with ports for the inlet and outlet of hydrogen, oxygen/air and electrolyte and with channels connecting the ports to corresponding chambers (FR 2564249, H 01 M 8/04, 15 Nov. 1985).

A drawback of this FC module is the absence of external current taps from each FC, which limits the variants of electrical switching of the FCs to only series connection by means of bipolar plates, and also the possibility of accumulating bubbles in the electrolyte channels and chambers and dropping liquid in the gas paths exists. This limits the possibility of using the module and reduces its operating reliability.

An FC battery is known comprising a plurality of FCs, a layered construction with insulating frames, which FCs are connected in series into a general electrical circuit by means of bipolar switching plates (U.S. Pat. No. 4,640,876, H 01 M 8/02, 3 Feb. 1987).

A drawback of this battery is the absence of current taps from each FC, which limits the possibility of electrically switching them in the battery and setting the required voltage and current values.

Among known FC batteries, the one most similar in respect to the combination of material features and achieved technical result is the FC battery comprising at least two FC modules (U.S. Pat. No. 5,069,985, H 01 M 8/02, 8 Dec. 1991).

A drawback of this battery is the absence of current taps from each FC, which limits the possibility of electrically switching them in the battery and setting the required voltage and current values.

SUMMARY OF THE INVENTION

The object of the invention is to create an FC module and a battery based thereon, which are suitable for any electrical switching circuit and have convenient management and increased reliability.

This technical result is achieved in that an FC module comprises at least two substantially rectangular FCs, each of which includes an anode with a current collector and an insulating frame positioned along the periphery of the anode and forming an anode chamber, a cathode with a current collector and an insulating frame positioned along the periphery of the cathode and forming a cathode chamber, and an electrolyte chamber formed by an insulating frame and positioned between the anode and the cathode, the insulating frames along the periphery are provided with ports for the inlet and outlet of hydrogen, oxygen/air and electrolyte and with channels connecting the ports to corresponding chambers. Wherewith the ports and channels are positioned on the upper and/or the lower sides of the insulating frames, and the current collectors are brought out of the fuel cell through the lateral sides of the insulating frames.

It is advisable that the ports for the inlet and outlet of hydrogen in the module of fuel cells be positioned on the upper side of the insulating frame. Positioning the ports on the upper side of the insulating frame prevents dropping liquid from entering the hydrogen inlet and outlet channels formed in the FC module by corresponding ports, which promotes the provision for uniform distribution of the hydrogen to the FCs.

It is advisable that the ports for the inlet of oxygen/air in the FC module be positioned on the upper side of the frame, and the ports for outlet of the oxygen/air be positioned on the lower side of the insulating frames. Such a positioning of these ports when dropping liquid appears in the cathode chambers ensures its removal by the flow of gas.

It is advisable that the ports in the FC module for the inlet of electrolyte be positioned on the lower side of the frames, and the ports for the outlet of the electrolyte be positioned on the upper side of the insulating frames. Such a positioning of these ports in the case of the presence of gaseous bubbles in the electrolyte chamber provides for their removal by the flow of electrolyte.

It is advisable that the ports in the FC module for the inlet of oxygen/air be smaller than the ports for the outlet of oxygen/air, wherewith the ratio of the areas of the ports for the outlet and inlet of oxygen/air is from 1.9 to 2.2. This ratio of the areas ensures uniform distribution of oxygen/air to the cells of the module and battery.

It is advisable that the ports in the FC module for the inlet of electrolyte be smaller than the ports for the outlet of the electrolyte, wherewith the ratio of the areas of the ports for the outlet and inlet of the electrolyte be from 1.7 to 2.0. This ratio of the areas ensures the required uniform distribution of electrolyte to the FCs included in the makeup of the modules and batteries.

It is advisable that the ports for the inlet of electrolyte in the FC module be positioned below the other ports, and the ports for the outlet of the electrolyte be positioned above the other ports, wherewith each of the ports for the inlet and outlet of the electrolyte be connected to electrolyte chambers by two arched channels. As a result of such a positioning, the ports for the inlet and outlet of electrolyte and the arched channels encompass all the remaining ports over the outer perimeter, forming a thermal screen. The presence of the thermal screen prevents the possibility for condensation and formation of dropping liquid in the anode and cathode chambers and also in the inlet and outlet ports and channels.

It is advisable that service access ports, connected to the anode chambers of the FCs by channels, be made in the FC module on the lower side of the insulating frames. The presence of such ports makes it possible to remove dropping liquid from the anode chambers, which gets there during technological operations or in the process of operation.

It is advisable that adjacent FCs in the module be mechanically connected to each other by welding or gluing. Making the modules in the form of a monolithic construction makes their development simpler and simplifies the assembly and switching of the batteries.

It is advisable that plate-like current taps, provided with a longitudinal cut in which the ends of current collectors are placed, be secured to the ends of current collectors extending out of the FCs, wherein the upper and lower ends of the current taps go outside the fuel cells and are made in the form of substantially rectangular rounded flanges with openings for securing electrical switching buses.

It is advisable that the FCs in the module be connected electrically in parallel, in series or parallel/series by means of "Π"-shaped buses of electrical switching, insulating and conducting washers, provided with holes, and a tightening stud with an insulating coating, which passes through the holes. The tightening stud may be made hollow, and its ends after switching may be expanded to prevent weakening of the tightening force. This electrical switching is distinguished by the simple construction and the multiple variety of the variants of the circuits for the electrical connection of the FCs.

It is advisable that in the FC module, depending on the type of electrical switching, the "Π"-shaped buses of electrical switching be mounted vertically, horizontally or both vertically and horizontally.

It is advisable that the anode chambers of the FCs in the module be separated into two, substantially equal, parts by a vertical rib, which does not reach the lower side of the anode chamber. The division of the anode chamber into two equal parts ensures uniform distribution of hydrogen over the surface of the electrode.

It is advisable that the cathode chambers of the fuel cells in the FC module be connected in parallel in respect to air.

It is advisable that the cathode chambers of the fuel cells in the FC module be connected in parallel or parallel/series in respect to oxygen. The type of connection in respect to oxygen is selected from the condition of ensuring the permissible pressure differential in respect to the oxygen contour.

It is advisable that the electrolyte chambers in the FC module be connected in parallel in respect to the electrolyte.

As regards the FC battery, it comprises at least two FC modules which are made as described above.

It is advisable that the modules in the battery be connected in parallel in respect to the electrolyte.

It is advisable that the modules in the battery be connected in parallel in respect to air.

It is advisable that the modules in the battery be connected in parallel or parallel/series in respect to oxygen.

It is advisable that the modules in the battery be connected in parallel, in series or in parallel/series in respect to hydrogen. The indicated connection of the FC modules in respect to the working mediums is determined by the predetermined pressure differentials in respect to corresponding contours.

It is advisable that the modules in the battery be connected electrically, in series or parallel/series. The circuit of connection of the modules in the battery is determined by predetermined voltage and current values.

The essence of the invention is elucidated by drawings and a description of the construction of the claimed FC modules and batteries.

BEST METHOD OF CARRYING OUT THE INVENTION

Figure 1:
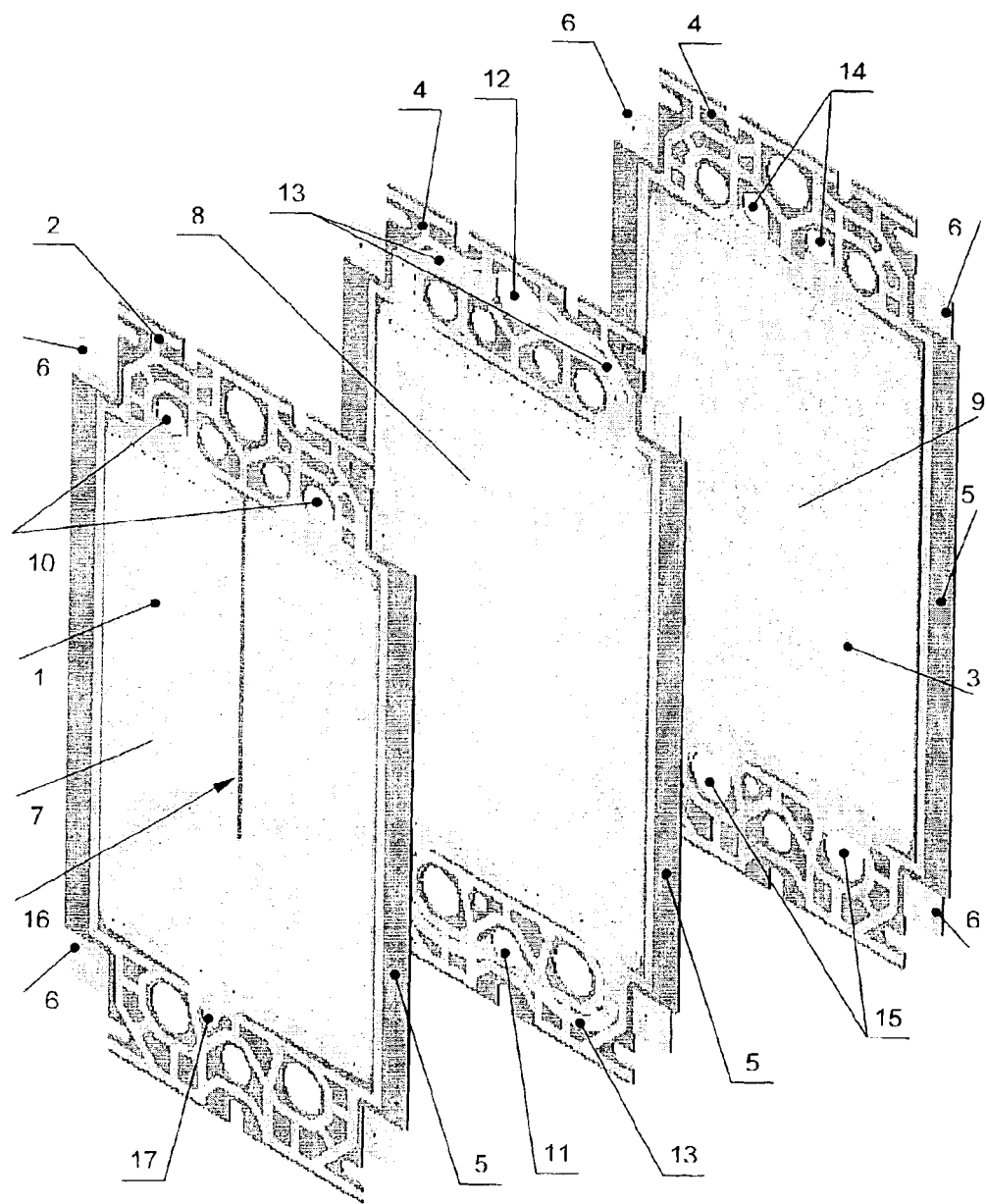
FIG. 1 shows composite parts of an FC module in axonometry.
Figure 2:
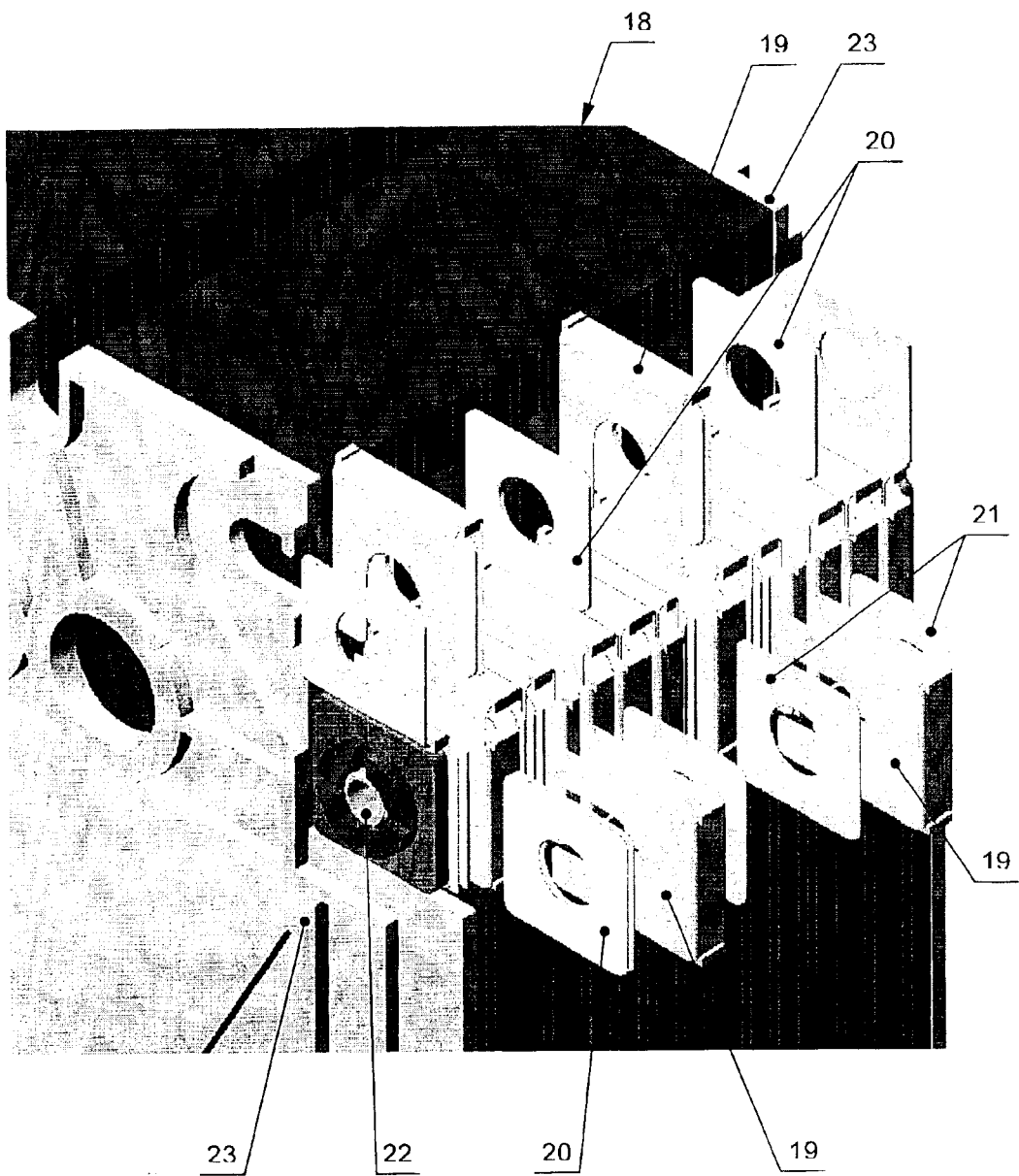
FIG. 2 shows the construction of electrical switching of a FC in a module in axonometry.

The proposed FC module comprises an anode 1, with a current collector (not shown in FIG. 1) and with an insulating frame 2, and a cathode 3 with a current collector (not shown in FIG. 1) and an insulating frame 4. The anode 1 and the cathode 3 are provided with current taps 5 with flanges 6, secured to the current collectors. The insulating frames 2 and 4 upon assembly of the module form an anode chamber 7, an electrolyte chamber 8 and a cathode chamber 9. The insulating frames are provided with ports for the inlet and outlet of hydrogen 10 into the anode chamber 7, ports 11 for the inlet and ports 12 for the outlet of electrolyte, connected by arched channels 13 to the electrolyte chamber 8, ports 14 for the inlet and ports 15 for the outlet of oxygen/air. The anode chamber is provided with a rib 16, separating the chamber into two equal portions, and a service access port 17 connected by a channel to the anode chamber. In a module 18 assembled by means of a mechanical connection in respect to the insulating frames of adjacent FC components, end power plates 23 and tightening studs (not shown in FIG. 2), inlet and outlet ports form internal collectors for the inlet and outlet of working mediums (hydrogen, oxygen/air, electrolyte). Electrical switching of the FCs (see FIG. 2) is carried out by means of "Π"-shaped buses 19, mounted vertically and horizontally depending on the scheme of FC connections, connecting 20 and insulating 21 spacers with holes and tightening hollow stud 22 with an insulating coating (not shown in FIG. 2). An FC battery of predetermined power is assembled from the aforesaid modules by electrical switching and connection in respect to the working mediums (hydrogen, oxygen/air, electrolyte).

The proposed FC battery works in the following manner. Hydrogen is fed into and removed from the anode chambers of the FCs through the ports 10 on the upper side of the insulating frames. The anode chamber is separated into two equal portions by the rib 16 which does not reach the lower side of the insulating frame. The presence of the rib in the anode chamber ensures uniformity of distribution of hydrogen over the surface of the anode. Positioning the hydrogen ports on the upper side of the insulating frames excludes the possibility for dropping liquid to enter the hydrogen collectors, which ensures uniformity of the distribution of hydrogen to the FCs. In order to provide the possibility of removing the dropping liquid from the anode chamber, which it has entered during refilling or in the process of operation, service access ports 17, connected by channels to the anode chambers, are made on the lower side of the insulating frame. These ports in the module form an internal collector and make it possible to remove dropping liquid from the anode chambers 7 of the FCs in the process of operating or during servicing. Furthermore, these ports make it possible, if necessary, to wash the anode chambers. Oxygen or air is fed into the cathode chambers through the inlet ports 14 positioned on the upper side of the insulating frames. The oxygen or air is outlet through the ports 15 positioned on the lower side of the insulating frames. The area of the inlet ports is about half the area of the outlet ports. Uniformity of the distribution of oxygen/air to the cathode chambers of the FCs is provided by the aforesaid ratio of the areas of the ports. Arrangement of the outlet ports on the lower side of the insulating frames ensures the removal of the dropping phase, appearing in the cathode chamber in the process of refilling or operation. The electrolyte is input into the electrolyte chambers from below through ports 11, the electrolyte is removed through ports 12. These ports are connected to the electrolyte chamber by means of two arched channels 13. The area of the inlet port is about half the area of the outlet port. This ratio of the areas of the ports ensures uniformity of distribution of the electrolyte to the FCs. The supply of the electrolyte from below and the removal from above ensures removal of bubbles from the electrolyte chamber of the FC, which have entered during loading or in the process of operation. The electrolyte ports and arched channels encompass all the inlet and outlet ports along the outer perimeter. Such a positioning of the ports creates a thermal screen, which prevents the possibility of condensation of water vapors and the formation of dropping liquid in the inlet and outlet gas collectors. In the process of operation of the FCs, electric power, heat and water are generated due to the flow of a current-forming reaction between hydrogen and oxygen. The electric power is sent to an external consumer by means of the buses for electric switching, while heat and water are removed by the flow of electrolyte and utilized by known methods by means of functional servicing systems.

INDUSTRIAL APPLICABILITY

This invention is designed mainly for use as a current source in autonomous power plants, during the production of electrochemical generators, and may also be used for any electrical switching circuit.

The detailed description of the construction and principle of operation of the proposed device, which is presented above, is sufficient for a specialist in this field of engineering to make the conclusion that its practical realization is possible with achievement of the indicated technical result.

What is claimed is:

1. A fuel cell module comprising at least two substantially rectangular fuel cells, each of which including an anode with a current collector and an insulating frame positioned along the periphery of the anode and forming an anode chamber, a cathode with a current collector and an insulating frame positioned along the periphery of the cathode and forming a cathode chamber, and an electrolyte chamber formed by an insulating frame and positioned between the anode and the cathode, the insulating frames along the periphery are provided with ports for the inlet and outlet of hydrogen, oxygen/air and electrolyte and with channels connecting said ports to corresponding chambers, characterized in that the ports and channels are positioned on upper and/or lower sides of the insulating frames, and the current collectors are brought out of the fuel cell through the lateral sides of the insulating frames.

2. The fuel cell module according to claim 1, characterized in that the ports for the inlet of hydrogen into and outlet from the anode chambers are positioned on the upper side of the insulating frames.

3. The fuel cell module according to claim 1 or claim 2, characterized in that the anode chambers of the fuel cells are separated into two parts by a vertical rib which does not reach the lower side of the anode chamber.

4. The fuel cell module according to any one of claim 1 or 2, 3, characterized in that the anode chambers of the fuel cells are separated into two equal parts by a vertical rib.

5. The fuel cell module according to claim 1, characterized in that the ports for the inlet of oxygen/air into the cathode chambers are positioned on the upper side of the frame, and the ports for the outlet of the oxygen/air are positioned on the lower side of the insulating frames.

6. The fuel cell module according to claim 5, characterized in that the ports for the inlet of oxygen/air into the cathode chambers are smaller than the ports for the outlet of oxygen/air.

7. The fuel cell module according to claim 6, characterized in that the ratio of the areas of the ports for the outlet and inlet of oxygen/air is from 1.9 to 2.2.

8. The fuel cell module according to claim 1, characterized in that the ports for the inlet of electrolyte into the electrolyte chambers are positioned on the lower side of the frames and the ports for the outlet of the electrolyte are positioned on the upper side of the insulating frames.

9. The fuel cell module according to claim 8, characterized in that the ports for the inlet of electrolyte into the electrolyte chambers are smaller than the ports for the outlet of the electrolyte.

10. The fuel cell module according to claim 9, characterized in that the ratio of the areas of the ports for the outlet and inlet of the electrolyte is from 1.7 to 2.0.

11. The fuel cell module according to claim 8, characterized in that the ports for the inlet of electrolyte are positioned below the other ports, and the ports for the outlet of the electrolyte are positioned above the other ports.

12. The fuel cell module according to any one of claim 8, 9, 10, or 11, characterized in that each of the ports for the inlet and outlet of the electrolyte is connected to electrolyte chambers by two arched channels.

13. The fuel cell module according to any one of claim 8 or 9–11, characterized in that the ports for the inlet and outlet of electrolyte and the arched channels encompass all the remaining ports over the outer perimeter, forming a thermal screen.

14. The fuel cell module according to claim 1, characterized in that service access ports, connected to the anode chambers of the fuel cells by channels, are made on the lower side of the insulating frames.

15. The fuel cell module according to claim 1, characterized in that adjacent insulating frames of fuel cells in the module are mechanically connected by welding or gluing.

16. The fuel cell module according to claim 1, characterized in that plate-like current taps, provided with a longitudinal cut in which ends of current collectors are placed, are secured to ends of current collectors extending out of the fuel cells, wherein upper and lower ends of the current taps go outside the fuel cells and are made in the form of substantially rectangular rounded flanges with openings for securing electrical switching buses.

17. The fuel cell module according to any one of claim 1 or 16, characterized in that the fuel cells in the module are connected electrically in parallel, in series or parallel/series by means of "Π"-shaped buses of electrical switching, insulating and conducting washers, provided with holes, and a tightening stud with an insulating coating, which passes through the holes of the current taps, electrical switching buses and washers.

18. The fuel cell module according to claim 17, characterized in that the stud is made hollow, and its ends after tightening are expanded.

19. The fuel cell module according to any one of claim 1 or 16, characterized in that depending on the type of electrical switching, the "Π"-shaped buses of electrical switching are mounted vertically, horizontally or both vertically and horizontally.

20. The fuel cell module according to claim 1, characterized in that the cathode chambers of the fuel cells are connected in parallel in respect to air.

21. The fuel cell module according to claim 1, characterized in that the cathode chambers of the fuel cells are connected in parallel or parallel/series in respect to oxygen.

22. The fuel cell module according to claim 1, characterized in that the electrolyte chambers of the fuel cells are connected in parallel in respect to the electrolyte.

23. A battery of fuel cells, comprising at least two fuel cell modules, characterized in that the module is made according to any one of claims 1–11, 14–16, 18 or 20–22.

24. The battery of fuel cells according to claim 23, characterized in that the modules in the battery are connected in parallel in respect to the electrolyte.

25. The battery of fuel cells according to claim 23, characterized in that the modules in the battery are connected in parallel in respect to air.

26. The battery of fuel cells according to claim 23, characterized in that the modules in the battery are connected in parallel or parallel/series in respect to oxygen.

27. The battery of fuel cells according to claim 23, characterized in that the modules in the battery are connected in parallel, in series or in parallel/series in respect to hydrogen.

28. The battery of fuel cells according to claim 23, characterized in that the modules in the battery are connected electrically, in series or parallel/series.

\* \* \* \* \*

UNITED STATES PATENT AND TRADEMARK OFFICE
CERTIFICATE OF CORRECTION

PATENT NO. : 6,872,487 B2
DATED : March 29, 2005
INVENTOR(S) : Ziya Ramizovich Karichev It is certified that error appears in the above-identified patent and that said Letters Patent is hereby corrected as shown below:

<u>Column 6,</u>
Lines 7, 38, 42 and 62, replace "any one of claim" with -- any one of claims --.

<u>Column 7,</u>
Line 6, replace "any one of claim" with -- any one of claims --.

Signed and Sealed this

Eighth Day of November, 2005

JON W. DUDAS
*Director of the United States Patent and Trademark Office*